United States Patent
Van Den Berg et al.

(10) Patent No.: US 8,770,145 B2
(45) Date of Patent: Jul. 8, 2014

(54) DAIRY ANIMAL TREATMENT SYSTEM

(75) Inventors: Karel Van Den Berg, Bleskensgraaf (NL); Dik-Jan Wisse, Kwintsheul (NL); Paulus Jacobus Maria Van Adrichem, Delfgauw (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 13/988,587

(22) PCT Filed: Nov. 7, 2011

(86) PCT No.: PCT/NL2011/000073
§ 371 (c)(1),
(2), (4) Date: May 21, 2013

(87) PCT Pub. No.: WO2012/081972
PCT Pub. Date: Jun. 21, 2012

(65) Prior Publication Data
US 2013/0239898 A1   Sep. 19, 2013

(30) Foreign Application Priority Data

Dec. 17, 2010 (NL) .................................. 1038458

(51) Int. Cl.
*A01J 5/017* (2006.01)
(52) U.S. Cl.
USPC .................................... 119/14.05; 119/14.08
(58) Field of Classification Search
USPC ................................ 119/14.05, 14.08, 14.18
See application file for complete search history.

(56) References Cited

U.S. PATENT DOCUMENTS

| | | | |
|---|---|---|---|
| 5,379,721 A | 1/1995 | Dessing et al. | |
| 5,918,566 A * | 7/1999 | van den Berg | 119/14.02 |
| 5,934,220 A * | 8/1999 | Hall et al. | 119/14.08 |
| 6,205,949 B1 * | 3/2001 | van den Berg | 119/14.02 |
| 6,213,051 B1 * | 4/2001 | Fransen | 119/14.08 |
| 6,647,919 B2 * | 11/2003 | Vijverberg | 119/14.08 |
| 6,742,474 B2 * | 6/2004 | van den Berg et al. | 119/14.08 |
| 7,044,079 B2 * | 5/2006 | Deelstra | 119/14.1 |
| 7,228,815 B2 * | 6/2007 | Kortekaas et al. | 119/14.02 |
| 8,651,051 B2 * | 2/2014 | Hofman et al. | 119/14.08 |
| 2005/0005861 A1 | 1/2005 | van den Berg et al. | |
| 2008/0000425 A1 | 1/2008 | van den Berg et al. | |
| 2008/0314323 A1 | 12/2008 | van den Berg et al. | |
| 2012/0298043 A1 * | 11/2012 | Birk et al. | 119/14.04 |

FOREIGN PATENT DOCUMENTS

| | | |
|---|---|---|
| EP | 0 643 907 | 3/1995 |
| EP | 0 777 962 | 6/1997 |
| EP | 1 479 290 | 11/2004 |

OTHER PUBLICATIONS

International Search Report Issued Feb. 15, 2012 in PCT/NL11/000073 Filed Nov. 7, 2011.

* cited by examiner

*Primary Examiner* — Yvonne Abbott
(74) *Attorney, Agent, or Firm* — Oblon, Spivak, McClelland, Maier & Neustadt, L.L.P.

(57) ABSTRACT

There is provided a method and system for connecting a teat cup (4) to a first teat (1) of an udder (3). In connecting, a first reference position (10) on the first teat (1) is taken for connecting, until that reference position (10) is covered by the teat cup (4), or is otherwise no longer observed. Then, a further reference position (11) on the udder is taken for tracking movements by the dairy animal. Thus the optimum reference position (10) is used for connecting, while when this optimum position is no longer available, a further reference position (11) is taken.

13 Claims, 1 Drawing Sheet

DAIRY ANIMAL TREATMENT SYSTEM

Figure 1:
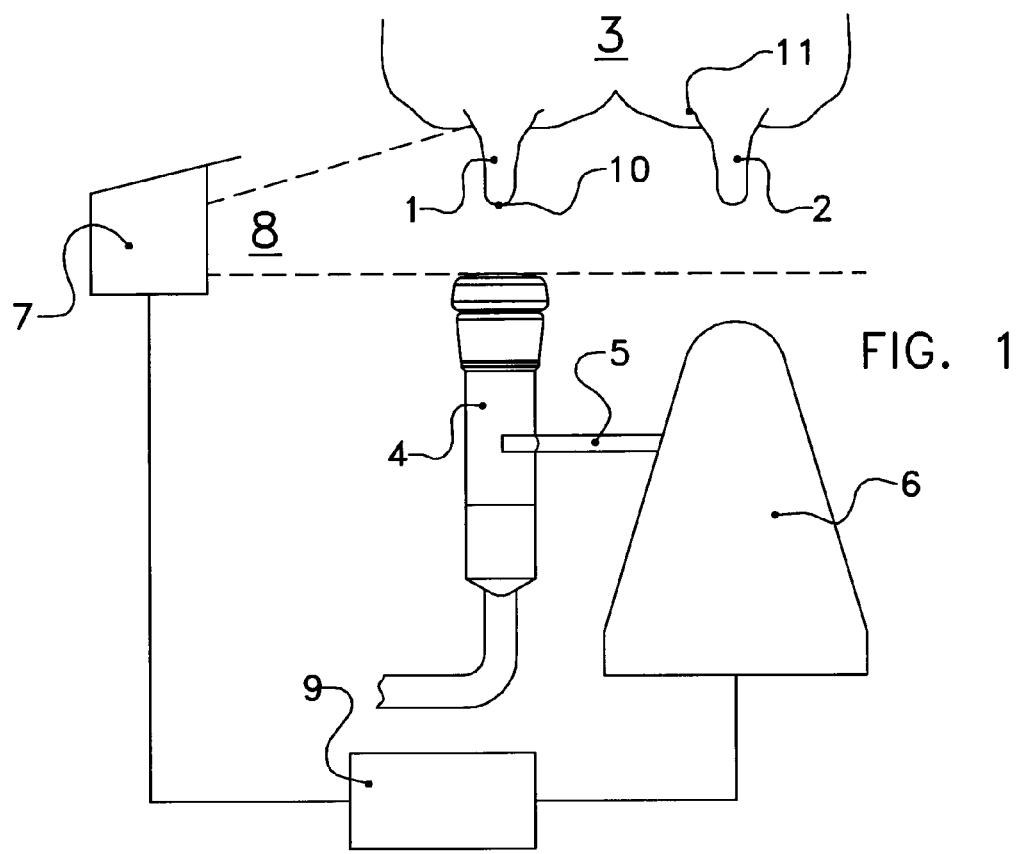

The invention relates to a method for automatically connecting an object to a teat of an udder of a milking animal, by means of a milking robot with a robot arm and a position determining device for determining reference positions on the animal with respect to one of a teat cup and the robot arm, the method comprising the steps of a) determining a first reference position of a part of the first teat to which an object is to be connected, wherein the object is a teat cup, b) positioning the teat cup below said teat by means of the robot arm and on the basis of the first reference position, c) moving the teat cup onto the teat, wherein the first reference position is observed and tracked during step b) and/or c).

Such a method is common in robotic milking, where teat cups are automatically attached to teats. These robots have a teat recognition device and a robot arm for connecting teat cups, based on a signal from the teat detection device. In connecting, it is important to achieve a high efficiency and reliability. Thereto, it is important to know the position of the teat accurately, because the opening of a teat cup is only about as large as the diameter of that teat part.

A problem of the known methods, and devices, is that the reliability of the connecting action, especially for the first teat to be connected, may be too low. This holds in particular for situations in which the cow moves during the connecting action. There is a substantial risk that, if the teat was already entering the teat cup, the teat would be drawn out of the teat cup.

It is an object of the present invention to improve the reliability and efficiency of this known method.

This object is achieved with a method of the kind mentioned in the preamble, that is characterized by the steps of d) determining a further reference position of another part of said udder with respect to one of the teat cup, the robot arm and the first reference position, and e) tracking said further reference position while the first reference position is not being observed with at least a predetermined accuracy or reliability, and performing the moving of the teat cup on the basis of the tracked further reference position.

The inventors realised that, on the one hand, having a good reference position is very useful and reliable for positioning the teat cup, but that, on the other hand, sometimes this reference position is no longer available, i.e. no longer detectable with sufficient precision or reliability. In that case, having a further reference position is useful to be able to switch tracking to that further reference position. For example, as soon as the teat cup is moved over at least a part of the teat, the first reference position is often no longer available for tracking. Thus, if an animal moves, or even worse: starts to move, during the moving of the teat cup over the teat, the tracking that is necessary for a reliable last part of the connection is impossible, and the reliability is lower. It is also possible that in a first position of the position determining device and/or dairy animal with respect to each other, determining a first reference position is possible with sufficient reliability while, when the mutual position then changes in order to connect the teat cup, tracking the first reference position turns out to be no longer possible with sufficient reliability because of covering or screening of said position or the like. For the position determining means is often mounted on the robot arm that moves the teat cup. It was found by the inventors to be advantageous if a further reference position is taken, that can be used during at least that last step of connecting the teat cup.

It is remarked that observing the reference positions with at least a predetermined accuracy or reliability relates to the steps (not described further here) in which the position detection device determines, from sensor input, the reference position(s). Thereto, it will require criteria for determining which part of the sensor input (an image or the like) forms a reference position. Sometimes the input is too ambiguous and it cannot decide this. This holds for situations such as bad (or worsening) lighting in visual detection or too much noise in e.g. acoustical detection. Of course, this encompasses the situation wherein the reference position is no longer detectable at all, such as after entering the teat cup.

Note that, herein, steps b) and c) may be hardly distinguishable in practice. For it is possible to position the teat cup below the teat and simply continue the movement with a smooth transition to the part wherein the teat cup is moved over the teat tip. However, the problem mentioned still holds, and even in this case, it is always possible to separate the movement into two parts, i.e. before the teat cup moves over the teat, and after the teat cup moves over the teat, in particular over the teat tip. However, in many milking robot systems, the robot arm with the teat cup is first positioned to directly below the teat tip and subsequently moved upward onto the teat. With such separate movements, the present invention provides optimum advantages.

It is noted that the teat cup may be a milking cup, or of another type, such as a cleaning cup, a disinfection cup or foremilking cup, or a combination thereof. What matters is that the teat enters a cup, such that the first reference position, such as a teat tip (part) is no longer visible or otherwise detectable.

According to the invention, said teat cup is the very first object to be positioned on any of the teats of the animal during connecting the teat cups for milking. It is remarked here that this use according to the invention, of a further reference position for the last part of teat cup connection, is of particular importance for that first teat. Note e.g. that some prior art methods use an external reference position for positioning and tracking, such as WO94/23565, in which in one embodiment as a first step a gripper is connected to the first teat, and in another embodiment as a first step the first teat cup is connected to the first teat. In both cases, as a next step the teat cups are connected to the other teats on the basis of a relative position with respect to the tracked position of this gripper or first teat cup. However, such a method of connecting a gripper or teat cup first suffers from the same drawbacks as mentioned in the introduction, in that that first teat cup has to be connected reliably first. Furthermore, in embodiments with the gripper, or similar embodiments in which as a first step there is determined some reference position away from the (first) teat on which a teat cup is to be connected, such as another teat, this known method is indirect from the start, and thus at least less reliable. Put more generally, when it is not the teat cup which is positioned as the very first object, any method will be indirect, while, if the teat cup is the very first object, the problem of the disappearing teat as the reference position during attachment of the teat cup will always be there. It is also noted that other further reference positions outside the udder, such as a plate pressed against the rear end of the cow, are unsatisfactory because the udder is flexibly suspended from the cow (or other dairy animal) with respect to such reference positions. This holds especially if the cow moves, for which problem the present invention provides a solution.

In the method according to the present invention, the step of determining the first reference position comprises collecting positional information about the first teat with the position detection means, followed by processing said positional information to provide the first reference position. This means that although some relatively easily determinable position, such as a teat tip, could have been taken directly as the first reference position, this position is processed, with other positional information such as determined other parts of the teat, to come to another position on that teat as the first reference position, such as the left or right (with respect to the position detection device) connection between teat and udder. Such processed reference position may have advantages over e.g. the teat tip, such as in this case the ability to track that processed reference position for a larger part of the connecting of the teat cup. Examples of positional information are the left and right vertical edges of the teat in an image of the teat. The center line between the two can determine a line for moving the teat cup upwards, et cetera. It is noted that this step of selecting a reference position from a plurality of positions may also be applied to the further reference position.

In embodiments, the step of determining a first reference position and/or the step of determining a further reference position comprises determining a plurality of candidate reference positions, and selecting one of the plurality of candidate reference positions, to provide the first reference position and/or the further reference position, respectively, on the basis of at least one predetermined selection criterion. This allows to take the best reference position in dependence of many variables such as the degree of contamination of the teat, specific shapes, lighting and so on. In fact, this same principle is used in the invention, as here, too, two reference position are used, while the criterion is that the first reference position is used as much as possible, and the further reference position is used when the first one is no longer detectable with sufficient accuracy and/or reliability.

It is noted that the determination of a reference position comprises establishing some relationship between that position and the space around it, e.g. a milking place, the teat cup, the teat position determining device or the robot arm, such that the robot arm can be controlled to connect the teat cup.

In the invention, after the first teat cup is connected, the other teat cups may also be connected according to the method of the invention or according to any method known in the art, since the problem solved relates especially to the first teat cup to be connected. After that first connection, e.g. the first teat cup may be taken as a reference position for the other teat cups, as is known from e.g. WO94/23565.

According to the present invention, preferably, the first reference position is the tip of the teat. As already mentioned above, the very teat tip is the most crucial part in connecting a teat cup, and determining its position will often give the most reliable results as compared to determining a more general teat position. However, it is also possible to take for example a position further up the teat, such as a dark spot on the skin, a purposive artificial marking such as a bar code, a position where the teat is connected to the other, or the like. Such positions often have an advantage, as mentioned above, that a larger part of the connecting can be performed on the basis of the first reference position.

Advantageously, the further reference position is determined either between step b) and step c) or during step c). In this way, there is the least chance that the actual but no longer determinable position of for example, and in particular, the teat tip will change with respect to the position of that further reference position.

In embodiments, the further reference position is determined as soon as the teat cup moves over the first reference position. When the teat cup moves over the first reference position, such as the teat tip, that position is no longer available for tracking purposes. If the further reference position is determined at that moment, the least possible time will have lapsed and the least the teat tip of that first teat can move with respect to the further reference position.

In an alternative embodiment, the further reference position is determined before the teat cup moves over the first reference position. Although this may leave some time between the two, in which time the further reference position may have shifted somewhat with respect to the actual first teat's tip position, this embodiment provides that the further reference position may be determined timely, because it may take a certain time to determine that further reference position. Then if the determining of the further reference position is started at least said certain time before the disappearance of the first reference position is expected, there need not be any time in which no reference position is available. It may be advantageous to determine both the first and the further reference positions substantially simultaneously or at least one directly after the other, and at least relatively long before the further reference position could be needed. In that case, it is advantageous if the further reference position is tracked with respect to the first reference position, either continuously or intermittently. In that case, the further reference position is not only always available upon disappearance of the first reference position, their mutual position is also known with very high accuracy. Switching the reference frame from the first reference position to the further reference position is then possible as well with that high accuracy.

Note that the step of determining the further reference position also comprises determining selecting the best candidate reference point to become the further reference point only at the moment when the first reference position is no longer needed. In this way, one always avails of the best other reference position, since the relative accuracy and reliability of the (candidate) further reference positions may change during e.g. moving of the teat cup or in time.

In embodiments, tracking on the basis of the further reference position is performed only after the teat cup moves over the first reference position. In this way, tracking is unambiguous and fastest, since tracking on the basis of two reference positions requires additional calculations, such as averaging or weighting. Hence, preferably, the steps of positioning the teat cup below said teat and moving the teat cup over the teat are performed on the basis of only the first reference position until the teat cup moves over the first reference position, and on the basis of only the further reference position after the teat cup moves over the first reference position.

A remark to be made here is that said switching of reference positions can be considered an important aspect of this invention. It is based on the insight that, especially for the first teat, in particular the teat tip position of the relevant teat is the most important, most reliable position for connecting a teat cup, and switching to another reference position can be done if that first one is no longer available. In all this, the circumstance that both are reference positions, the positioning of the teat cup can be continued with reliability, as both, or all, reference positions will have a known positional relationship to each other.

In embodiments, steps d) and e) are repeated for at least one additional further reference position, which is tracked and used for moving the teat cup, while oth the first and the further reference positions are no longer detectable with at least a predetermined accuracy or reliability. This takes into account the circumstance that in some unfavorable situations both reference positions may be difficult to detect, for example with very dirty teats, in case of a cleaning cup.

Advantageously, tracking of the further reference position is performed until the first reference position is again observed with at least a predetermined accuracy or reliability.

This holds for example when lighting improves again, or when the position detection device has moved further, on the robot arm or the like, such that a teat that was taken as comprising the reference position is no longer covered or screened by another part. In other words, the invention encompasses the situation in which the switching to the further reference position is only temporary.

In particular, the further reference position comprises, and preferably is, one of a position of an udder wall part and a position of another teat, preferably another teat tip, of the udder. Advantageously, it is a position on the udder wall where said first teat is connected to the udder. This has the advantage that there is a rather direct connection between the (no-longer visible) first reference position and the further reference position, both on the same teat. Alternatively, and also advantageously, it is another teat tip position, which has the advantage that a further teat cup may be connected to that further teat right away, in the meantime having time to determine a second further reference position for connecting that second teat cup, if desired. Said position of an udder wall preferably relates to a well-recognisable part thereof, such as the base of another teat or the like.

The invention also provides a system according to claim 11. This system is arranged to perform the method according to the invention, and will hence provide the same advantage in reliably connecting at least the very first teat cup.

In principle, the position determining device may be any device capable of determining the required reference positions. Advantageously, however, the position determining device comprises an optical device, preferably a laser scanner, more preferably an optical camera, most preferably a 3D camera. These optical devices can determine the position of the teat, in particular the teat tip part, more in particular the teat tip, quickly and with high precision. For instance, a laser scanner could work with one or more laser lines that are scanned along the teat. As soon as a reflection of a line disappears, the teat tip is reached. In a video camera image, image recognition can provide the position of any desired part, here in particular the teat tip part, more in particular the teat tip. A 3D camera can not only provide a similar image as a video camera, but additionally with depth information. With such a device, and with the corresponding method, it is advantageous if the optical device provides an image containing the first and the further reference positions. Then, the control unit, which will be provided in the system and which will then comprise image processing instructions, can determine not only the first and further reference positions, as required in various steps of the invention, but also their mutual position. This holds in particular for the embodiment with the 3D camera, which can directly determine full 3D positions, and from those also a mutual positioning.

Figure 2:
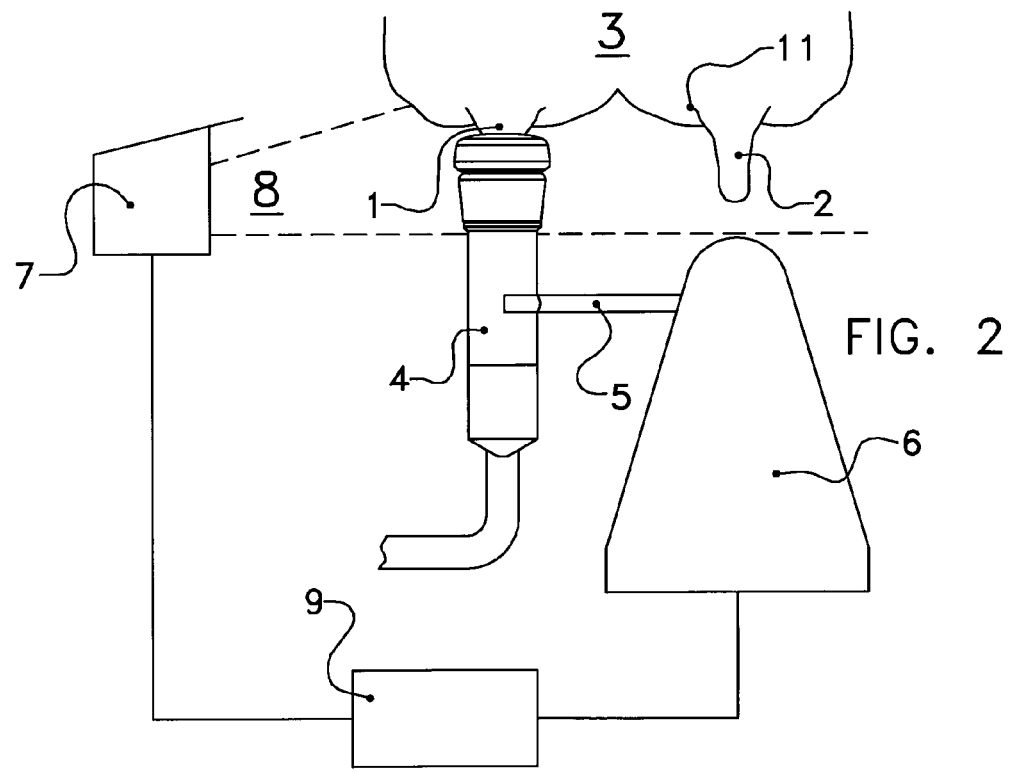

The invention will now be elucidated with reference to one or more non-limiting embodiments in the drawings, in which:

FIG. 1 diagrammatically shows a first step of the method of the invention, with a system according to the invention, and FIG. 2 diagrammatically shows a second step in the method.

FIG. 1 diagrammatically shows a first step of the method of the invention, with a system according to the invention. Herein, a first teat 1 and a second teat 2 of an udder 3 are shown. A teat cup 4 can be attached by means of a robot arm 5 of a milking robot 6, via camera 7 with a field-of-view 8, and under control of control unit 9.

Furthermore, a first teat tip 10 and a second reference position 11 are shown.

Of the udder 3 only two teats are shown for clarity purposes, to with a first teat 1 and a second teat 2. The udder could be of a goat, having only two teats, but the animal could also be e.g. a cow or other milking animal, most often having four teats.

In automatic milking, a teat cup 4 is to be connected to a teat. For milking, the teat cup 4 is a milking cup, for cleaning and/or disinfection and/or foremilking, this could be the same cup, or a separate teat cup. In all cases, there will be a first teat onto which such a cup will be connected, in the present case designated first teat 1. In connecting, the teat cup 4 is moved by means of a robot arm 5 of a milking robot 6 over the teat tip 10 of the first teat 1. This teat tip 10 is received in the teat 4 cup via a relatively narrow opening. This opening is only a few millimeters wider than the width of the teat 1. Therefore, it is important that the position of the teat tip 10 is known with precision.

The milking robot 6 is controlled by a control unit 9, such as a computer, which in turn receives input from a camera 7. This camera 7 serves as a teat detection device, as is known in the art. In this case, the camera 7 is an optical camera, having a field of view 8 in which the first teat 1 and the second teat 2 are visible. Image recognition software is able to determine the position of the teat tip 10. This image recognition software could be a part of the control unit 9. The position of the teat tip 10 serves as a reference position, on the basis of which the milking robot moves the teat cup 4.

Because of the shape of the teat, connecting can most often be thought of as consisting of two steps. In the first step, the teat cup 4 is brought to beneath the teat tip 10. The next step is then to move the teat cup 4 upwards over the teat 1. Although theoretically these two parts can have a smooth transition, in practice the two parts can most often be separated.

If a cow or other milking animal would stand still, connecting the teat cup 4 would be relatively easy, as the reference position would never change. However, in real life, the cow can, and often will, move. This causes a shift of the first reference position, of the teat tip 10. This position is tracked, in order for the robot to correctly attach the teat cup.

However, this is not always possible, and the solution to this problem, according to the invention, will be elucidated with reference to FIG. 2, showing a second step in the method. Herein, the same reference numerals are used for the same parts.

When the first part of the connecting has been completed, the teat cup 4 is directly below the teat tip 10. Next, the teat cup 4 is moved upwards to move over that teat tip 10. Still, the cow can move during this phase, in which the teat 1 is only partly in the teat cup 4. This moving may result in the teat 1 being drawn out of the teat cup 4 again. This is of course undesirable, but cannot be prevented on the basis of the first reference position (teat tip 10), because that is no longer visible.

The present invention solves this by switching the tracking to further reference position 11, in this case a position where the second teat 2 is connected to the udder 3. Of course, this further reference position 11 can be tracked during the upward movement of the teat cup 4. Therefore, if a cow would move during this phase, the position of further reference position 11 can be followed, and from that, with good accuracy, also the (implied) shifting of the position of the first teat 1. This further reference position may be taken arbitrarily, but preferably of course such that a high reliability is achieved. For example, one could take the tip of the second teat 2 as the further reference position, because this can often more easily be determined by the teat recognition device.

Note that simply taking the further reference position as the only reference position, to be used during all of the connecting steps, is not as reliable as the present method, since this would make the connecting indirect. Since the udder 3 is rather flexible, the position of the teat tip 10, which is to be used for connecting in the end, may shift with respect to the (further) reference position, especially when the cow moves and therefore the udder as well. The insight is that this indirect reference is only taken when one has to, because the reference position of choice (the teat tip 10) is no longer visible.

It is noted that the teat tip 10 is the most direct determination of the teat part that determines whether or not a teat can be received by the teat cup 4. More generally, this is determined by the lower part of the teat, from the tip to where the width of the teat is that of its main body. Therefore, the first reference position can also be taken in that part, the teat tip part.

The camera 7 may also be a 3D camera, which determines the position of the teat tip 10 et cetera in 3 dimensions. This may be done on the basis of a phase shift between a reflected wave and a reference wave, or by time-of-flight, as is known in the art. Alternatively, the camera 7 could also be e.g. a laser scanner, in which one or more laser beans are directed towards the teats 1, 2, and the reflections are used to determine distance via e.g. triangulation. Again, the lower teat tip part of the teat 1, 2, preferably the tip but more generally the narrowing part, will determine the first reference position.

The embodiments shown are not intended to be limiting. Rather, the scope of protection is determined by the appended claims.

The invention claimed is:

1. Method for automatically connecting an object to a teat of an udder of a milking animal, by means of a milking robot with a robot arm and a position determining device for determining reference positions on the animal with respect to one of a teat cup and the robot arm, the method comprising the steps of
   a) determining a first reference position of a part of the first teat to which an object is to be connected, wherein the object is a teat cup,
   b) positioning the teat cup below said teat by means of the robot arm and on the basis of the first reference position
   c) moving the teat cup onto the teat,
   wherein the first reference position is observed and tracked during step b) and/or c) characterized by the steps of
   d) determining a further reference position of another part of said udder with respect to one of the teat cup, the robot arm and the first reference position, and
   e) tracking said further reference position while the first reference position is not being observed with at least a predetermined accuracy or reliability, and performing the moving of the teat cup on the basis of the tracked further reference position.

2. Method according to claim 1, wherein the first reference position is on a tip part of the teat, and in particular is the teat tip.

3. Method according to claim 1, wherein the tracking of the further reference position is performed during at least a part of step c).

4. Method, according to claim 1, wherein the further reference position is determined either between step b) and step c) or during step c).

5. Method according to claim 1, wherein the further reference position comprises, is, one of a position of an udder wall part and a position of another teat, preferably another teat tip, of the udder.

6. Method according to claim 1, wherein the further reference position is determined as soon as the teat cup moves over the first reference position.

7. Method according to claim 1, wherein tracking on the basis of the further reference position is performed only after the teat cup moves over the first reference position.

8. Method according to claim 1, wherein the steps of positioning the teat cup below said teat and moving the teat cup over the teat are performed on the basis of only the first reference position until the teat cup moves over the first reference position, and on the basis of only the further reference position after the teat cup moves over the first reference position.

9. Method according to claim 1, wherein steps d) and e) are repeated for at least one additional further reference position, which is tracked and used for moving the teat cup, while both the first and the further reference positions are no longer detectable with at least a predetermined accuracy or reliability.

10. Method according to claim 1, wherein the position determining device comprises an optical device, preferably a laser scanner, more preferably an optical camera, most preferably a 3D camera.

11. Method according to claim 10, wherein the optical device provides an image containing the first and the further reference positions.

12. System for automatically connecting an object to a teat of an udder of a milking animal, comprising a milking robot with a robot arm and with teat cups, and a position determining device for determining reference positions on the animal with respect to one of a teat cup and the robot arm, the system being arranged to perform the method according to any preceding claim.

13. System according to claim 12, wherein the position determining device comprises an optical device, preferably a laser scanner, more preferably an optical camera, most preferably a 3D camera.

* * * * *